Jan. 5, 1932. J. C. WHITE 1,840,280
SIGNAL SWITCH
Filed May 31, 1927
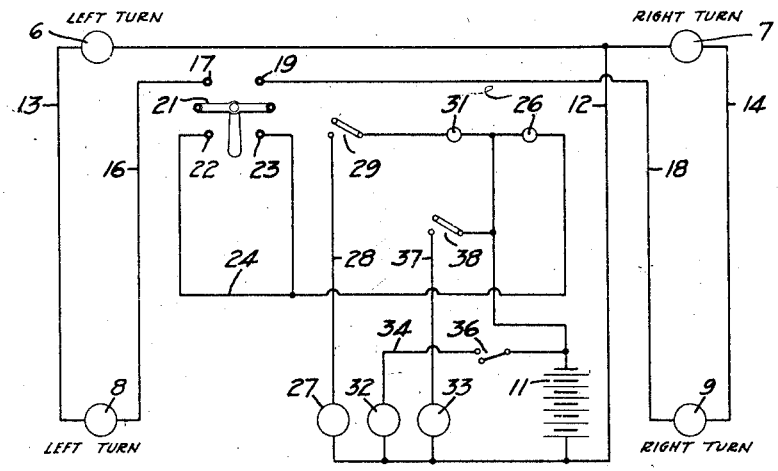
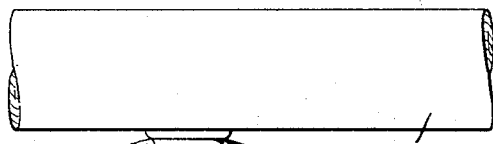
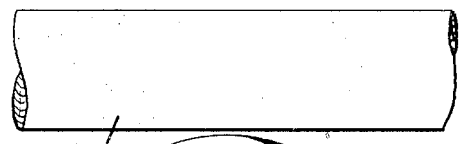
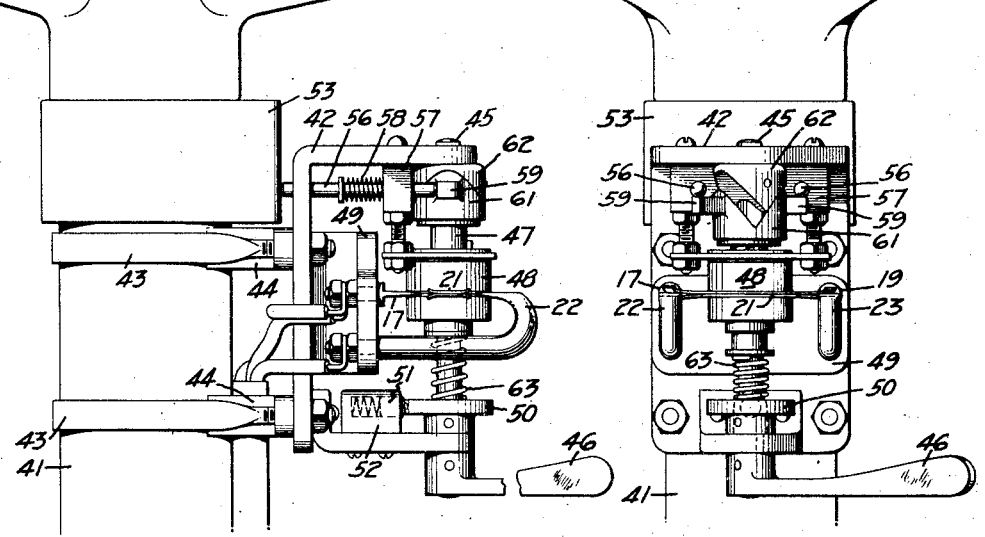
INVENTOR
John C. White
BY
White, Root & Fryer
his ATTORNEYS Patented Jan. 5, 1932

1,840,280

UNITED STATES PATENT OFFICE

JOHN C. WHITE, OF EUREKA, CALIFORNIA, ASSIGNOR, BY DECREE OF DISTRIBUTION, OF ONE-HALF TO BERTHA ROBINSON MURRAY

SIGNAL SWITCH

Application filed May 31, 1927. Serial No. 195,176.

My invention relates to means for signaling to other drivers, the intentions of a vehicle driver when he is about to turn his vehicle or come to a stop. In some localities the requirement is made that a vehicle driver signal with his hand prior to altering the course of his vehicle, but such hand signals are quite often invisible at night and are consequently of no avail.

It is therefore an object of my invention to provide an illuminated automobile signal which will be readily visible in the daytime and at night.

Another object of my invention is to provide a complete signaling system for an automobile.

Another object of my invention is to differentiate between signals seen by a person approaching the signaling vehicle head on and one overtaking the signaling vehicle from the rear.

A further object of my invention is to provide means for indicating to the driver whether or not the electric signals are operating.

An additional object of my invention is to provide a convenient operating switch for actuating or energizing the various lights and which will automatically restore the turn signals to neutral position after a turn has been executed.

My invention possesses other advantageous features, some of which with the foregoing, will be set forth at length in the following description where I shall outline in full that form of the automobile signaling system of my invention which I have selected for illustration in the drawings accompanying and forming part of the present specification. In said drawings I have shown one form of automobile signaling system embodying my invention, but it is to be understood that I do not limit myself to such form since the invention as set forth in the claims, may be embodied in a plurality of forms.

In the drawings:

Fig. 1 is a wiring diagram showing a convenient circuit arrangement for the various components of my signaling system.

Fig. 2 shows in side elevation a portion of a steering column with the switch unit of my system installed thereon.

Fig. 3 is a front elevation of the switch unit of my signaling system installed on a vehicle steering column.

The signaling system of my invention preferably comprises visible indicators for indicating, in the daytime and at night intentions of the driver of the vehicle to which the indicators are attached relative to altering the course of the vehicle, and incorporates an automatic means for setting the manual signal selector in neutral position if an incorrect signal is given and also after the execution of an indicated maneuver.

The signaling system preferably includes a pair of signal lights 6 and 7 on opposite sides of the vehicle and visible from the front which are connected in series with a pair of corresponding lights 8 and 9 on opposite sides of the vehicle and preferably at the rear thereof so as to be visible from the rear, the lights 6 and 7 conveniently being made to emit a white light while the lights 8 and 9 are made to emit a green light. From one terminal of a battery 11, which conveniently can be the battery of the ignition system of the vehicle, a conductor 12 branches and leads to the lights 6 and 7 while a conductor 13 connects in series the lights 6 and 8 and a similar conductor 14 connects in series the lights 7 and 9. From the light 8 a wire 16 leads to a terminal 17 while a wire 18 is connected to the light 9 and leads to a terminal 19. A manually rotatable bridge 21 connects either one of the terminals 17 or 19 to terminals 22 and 23 both of which are connected to a conductor 24 leading to the other side of the battery 11. To indicate to the operator whether or not the lights are in working order, a pilot light 26, served by conductor 24 conveniently is installed so that it is in series with whichever pair of lights is illuminated.

A stop light 27, which conveniently is made to emit a red light, is installed in the circuit by means of a conductor 28 having a suitable switch 29 therein and leading through a pilot light 31. The switch 29 can be operated by the brake pedal of the vehicle in the usual manner. The stop light 27, a tail light 32 and a reverse light 33 conveniently are arranged as a unit at the rear of the vehicle, the tail light being provided with a conductor 34 leading to a switch 36 to the battery 11 and the reverse light 33 being connected to the battery by a conductor 37 leading through a switch 38. The reverse light conveniently can be arranged with the gear shift lever of the car so as to be energized when such lever is placed in reverse position.

I preferably provide means for actuating the bridge 21 so that it can be manually operated to close either of the circuits at the discretion of the driver but that after the completion of the maneuver indicated by the resultant signal, or while so maneuvering, the switch will automatically be returned to neutral position. Also, so that if one maneuver is signaled and a different maneuver is executed, or being carried out, the signal will automatically be returned to neutral position. On the steering column 41 of the vehicle, I preferably secure a bracket or base 42. The base is suitably held in place by straps 43 and space blocks 44. The base can conveniently be made of a metal strap with upstanding ends to provide end abutments. Journaled within the ends of the base 42 is a thru shaft 45 provided at its lower end with a handle 46 by means of which it can conveniently be rotated at will of the operator. Surrounding the shaft 45 and slidable thereon is a sleeve 47 to which is keyed an insulating hub 48 carrying the metallic bridge 21. The contacts 17, 19, 22 and 23 are all supported in an insulating block 49 secured to the base 42 and are connected as described to the conductors 16, 18 and 24.

Rotation of the handle 46 is capable of bridging a pair of the contacts to energize the selected circuit. I preferably provide restraining means for holding the handle 46 in neutral position comprising an indented disc 50 pinned to the shaft 45 and engaged by a spring-pressed plunger 51 mounted in a guide 52 on the base 42. In order to return the handle 46 to neutral position and to disconnect the contacts 17, 19, 22 and 23 at the conclusion of a signal there is provided a cam 53 mounted on the steering column and arranged to turn with the steering wheel 54. The cam is generally circular except for a radial extension which engages a pair of parallel pins 56 mounted in the base 42 and in extension 57. Coil springs 58 urge the pins 56 toward the cam 53. The remote ends of the pins, when engaged by the extension of the cam 53, bear against diametral ears 59 extending from a cam-face block 61 secured on the sleeve 47 surrounding the shaft 45. A collar 62 fastened to the shaft 45 has a cooperating cam face engaging the block 61.

When the handle 46 is rotated to either side to make connections between diametrically opposite points, if the cam projection 53 is not in the way, one of the ears presses corresponding pin 56 toward the cam. The block 61 turns in unison with the collar 62 and the connection is made. When the steering wheel is suitably revolved to bring the extension of the cam 53 into contact with the projecting pins 56, one of the pins is driven back, contacting with the ear 59 and returning the entire structure to neutral position. This is the action when the vehicle is brought back to normal driving position after executing the maneuver indicated by the previously given signal or upon any major turning of the wheel 54 which causes the radial extension of the cam 53 to engage the pins 56. If it so happens that the steering wheel is positioned with the extension of the cam 53 in line with the pins 56 when it is desired to initiate a signal, the movement of handle 46 first causes an axial displacement between the collar 62 and the block 61, driving the ears 59 axially downward so that they pass below the pins 56. They are then free to rotate and the signals can be given in the previous manner. Upon a turning of the wheel 54, the extension of the cam 53 is disengaged from the pins 56, the block 61 thereupon returning to its normal position in engagement with the collar 62 and one of the ears 59, depending upon the throw of the switch, will press the corresponding pin 56 against the cam 53. The return of the block 61 to its normal position is aided by a coil spring 63 surrounding the lower end of shaft 45 and urging the block 61 and collar 62 toward axial displacement. Upon a suitable turning of the wheel 54 to bring the extension of the cam 53 again into contact with the pins 56, one of the pins is forced against the corresponding ear 59 thereby returning the switch to neutral position. The structure, it is to be noted is assembled so that the switch is in neutral position upon the return of the steering wheel to its position for straight ahead driving.

A housing, not shown, preferably encloses the mechanism described and makes a neat appearing device for automatically returning the signaling device to neutral position after the indicated maneuver has been executed or if an incorrect signal has been given for the maneuver. I have therefore provided a signal system which is visible to those ahead of the car as well as those to the rear of the automobile and which indicates the intentions of the driver regarding his subsequent maneuvers, together with an automatic device for returning the system to neutral position upon the execution of the maneuver. It will be appreciated that with the system of my invention it is easy to determine in the daytime the location of the signal lights, whether right or left, as the entire automobile can be seen, while at night the rear signal lights are easily located by reference to the position of the tail light and the front signal lights are located by reference to the position of the head lights.

I claim:

1. In combination with a steering column of a vehicle, said column having an outer shell, a cam mounted on said shell, an electric switch comprising a base mounted on said column, a shaft rotatable on said base, means for rotating said shaft, contacts on said base, contacts carried on said shaft for engaging said first named contacts upon rotation of said shaft, an axially yieldable collar connected to said shaft, and pins actuated by said cam to rotate said collar to disengage said contacts.

2. An electric switch comprising a base, a cam rotatable with respect to said base, a shaft rotatable on said base, contacts on said base, contacts carried on said shaft for engaging said first-named contacts, an axially movable collar yieldingly connected to said shaft, and pins for rotating said collar to disengage said contacts; said pins being adapted to be actuated upon rotation of said cam.

3. An electric switch comprising a base, a cam rotatable with respect to said base, a collar rotatably mounted on said base, a shaft yieldably connected for rotation with said collar, contacts on said base, contacts on said collar for engaging said first-named-contacts, ears on said collar, pins mounted on said base adjacent said ears and adapted to be actuated by said cam to rotate said collar and said shaft by engaging said ears whereby said contacts are disengaged, and means for rotating said shaft independently of said cam.

4. An electric switch comprising a base, a cam rotatable with respect to said base, a collar rotatably mounted on said base, a shaft mounted to rotate on said base, cooperating cam faces on said collar and on said shaft forming a yielding connection therebetween, contacts on said base, contacts on said collar for engaging said first-named-contacts, and means for rotating said collar and shaft upon rotation of said cam to disengage said contacts.

5. In combination with a rotatable member having mounted thereon a cam with a radial extension, a switch comprising a base, a shaft rotatable in said base, contacts secured to said base, a collar yieldingly connected to said shaft, contacts carried on said collar adapted to engage with the contacts on said base, a sleeve surrounding said shaft, a cam face block secured to said sleeve, pins mounted on said base the outer ends of which are adapted to bear against diametrical ears extending from said cam face block and the inner ends of which are adapted to engage the radial extension of said cam upon rotation of said cam whereby said shaft is rotated and said contacts are disengaged, a bridge mounted on said shaft adapted to connect contacts on said base with contacts on said collar, and a handle for rotating said shaft independently of said cam.

In testimony whereof, I have hereunto set my hand.

JOHN C. WHITE.